Dec. 13, 1938.  C. L. EKSERGIAN ET AL  2,140,261
BRAKE
Filed Oct. 9, 1934  3 Sheets-Sheet 1
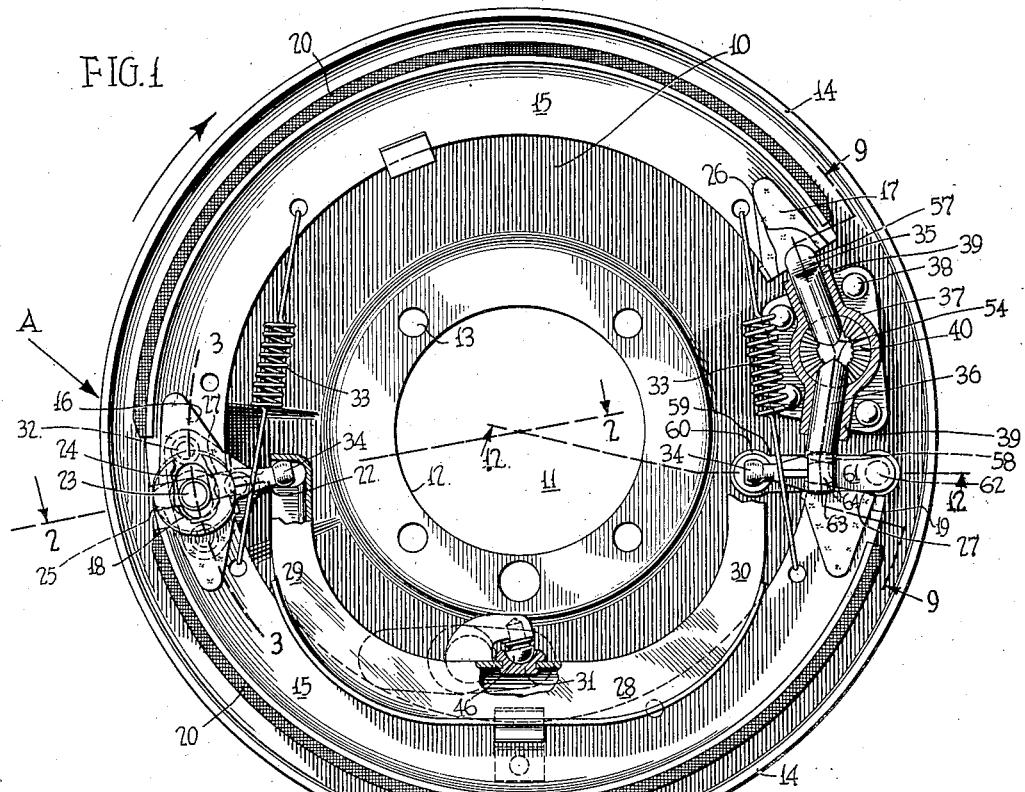
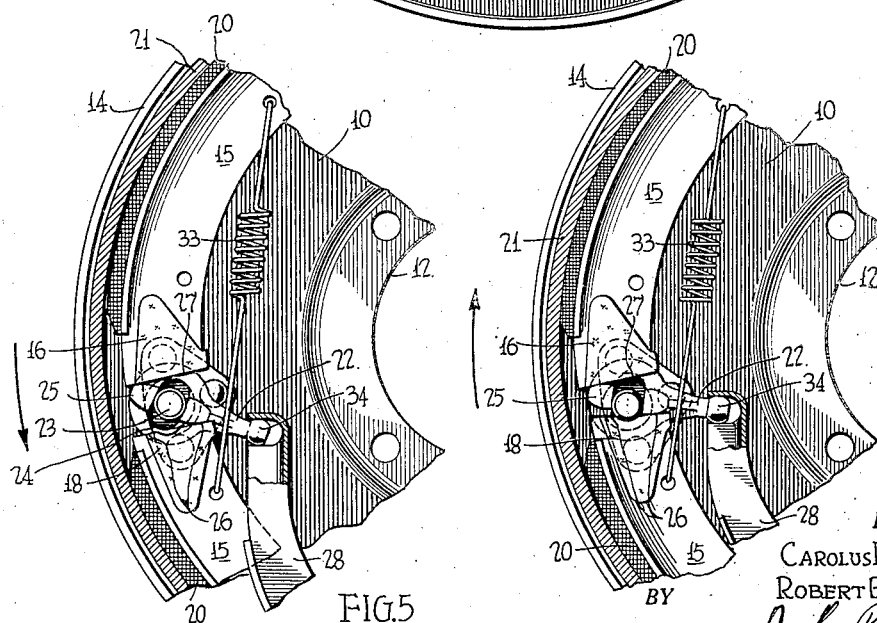
INVENTORS
Carolus L. Eksergian
Robert B. Temple
BY John P. Taylor
ATTORNEY.

Dec. 13, 1938.  C. L. EKSERGIAN ET AL  2,140,261
BRAKE
Filed Oct. 9, 1934  3 Sheets-Sheet 2
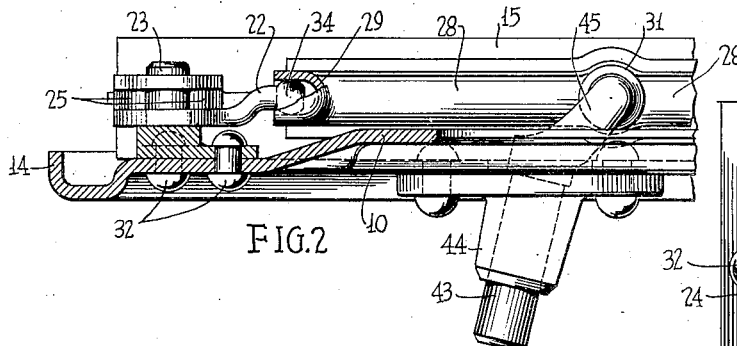
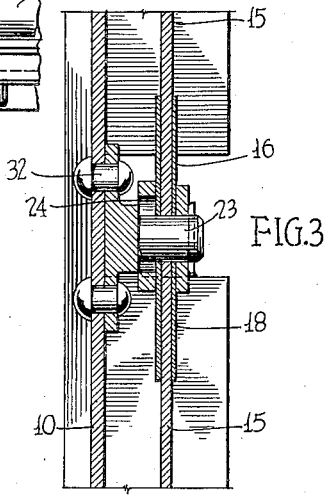
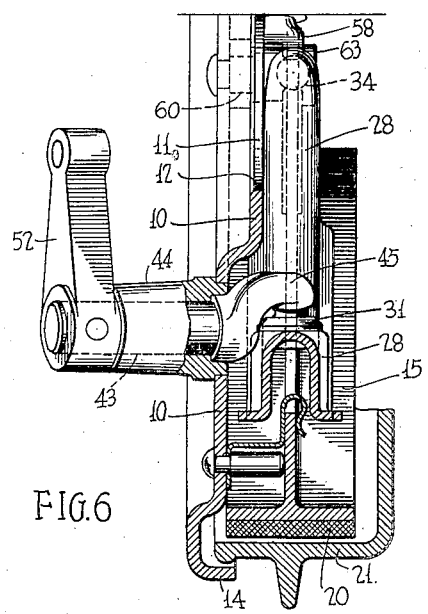
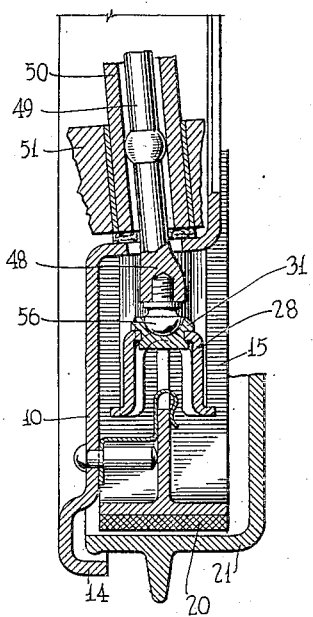
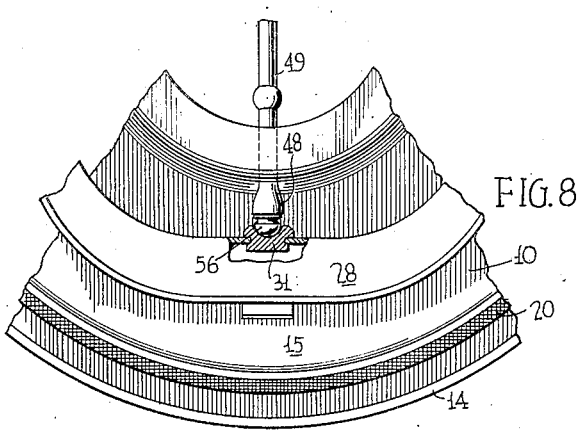
INVENTORS
CAROLUS L. EKSERGIAN
ROBERT B. TEMPLE
BY John P. Tarbox
ATTORNEY.

Dec. 13, 1938.  C. L. EKSERGIAN ET AL  2,140,261
BRAKE
Filed Oct. 9, 1934   3 Sheets-Sheet 3
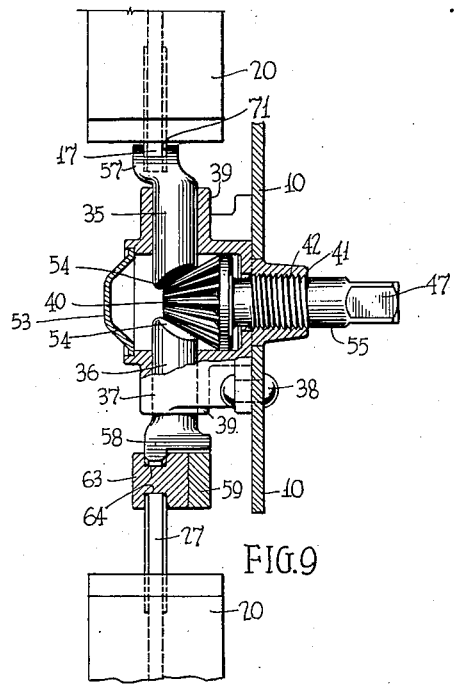
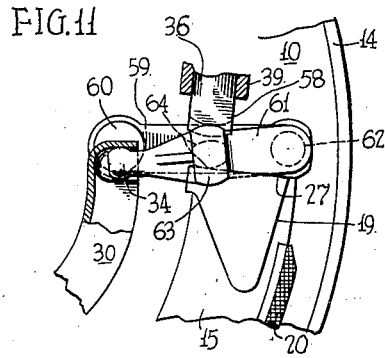
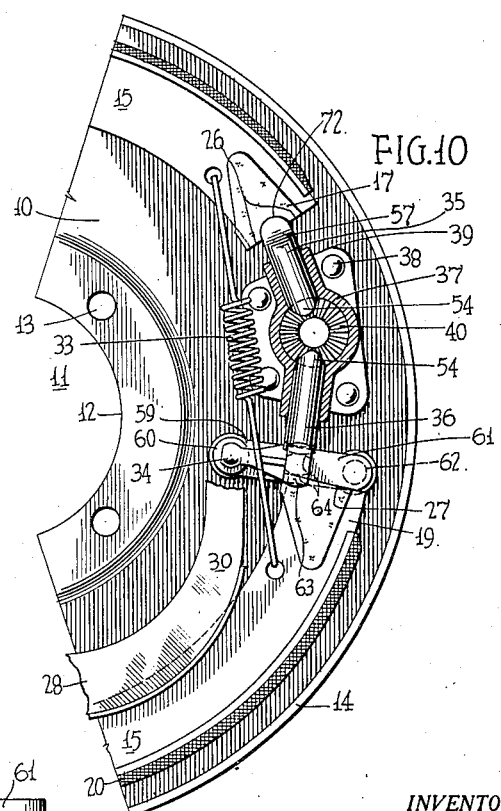
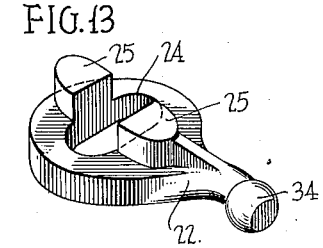
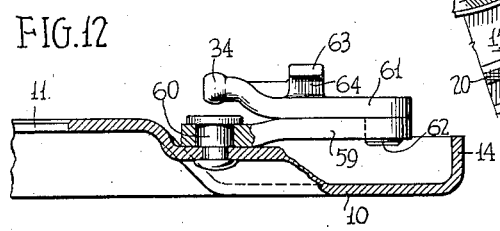
INVENTORS
Carolus L. Eksergian
Robert B. Temple
BY
ATTORNEY.

Patented Dec. 13, 1938

2,140,261

UNITED STATES PATENT OFFICE 2,140,261

BRAKE

Carolus L. Eksergian and Robert B. Temple, Detroit, Mich., assignors to Budd Wheel Company, Philadelphia, Pa., a corporation of Pennsylvania Application October 9, 1934, Serial No. 747,505

10 Claims. (Cl. 188—78)

This invention relates to brakes, particularly for automobiles and other self-propelled vehicles, and is characterized by features which have application to other types of brakes.

The invention relates to internal brakes of the multiple shoe type, especially the two shoe type. More particularly, it relates to the two shoe type of brake which perhaps is most significantly termed a symmetrical two shoe brake, in that one of its principal aims is the development of a two shoe brake which will be powerful and efficient in each direction of the movement of the part which is braked, that is, in each the forward and reverse movements of the vehicle.

Brakes of this general object have been previously proposed. Our aim is to produce such a brake of more perfect symmetry of application of power and greater power and efficiency. Co-relatively we aim to produce such a brake which has the fewest possible number of parts, has a low tooling cost, a low cost of production in quantity, and is of the lightest possible weight consistent with strength, reliability, durability, adjustability and ruggedness.

These aims and others are attained in large part through the utilization between the adjacent ends of the brake shoes of load applying means developing, respectively, different loads under identical applied power, together with power applying means, so adjusting the power application as to realize the developed loads. We further realize these ends by employing floating load applying means between adjacent shoe ends of the pairs by providing fixed anchors adjacent the adjacent ends of the pairs co-acting alternatively with the respective shoe end of the pairs. Similarly, centering means for the brake in its idle condition are provided between the adjacent shoe ends and the shoe ends arranged to co-act therewith in varying degrees of centering action according to the direction of operation of the brake, each shoe end of a pair differently from the other shoe end of a pair. Adjustments of the brake shoe and system to compensate for wearing of the parts is accomplished by a single means positioned between one group of adjacent ends of the brake shoes. The operating linkage is so constructed that heel and toe adjustments of the brake through the intermediation of radial and tangential corrections are automatically accomplished by one adjusting operation. In the specific embodiments shown in the accompanying drawings, we delineate a mechanically operated brake in which the load applying means consists of cam levers floated between shoe ends of the pairs. The cams of these levers co-act with the shoe ends of the pairs, variably developing the load for equal application of the power. The levers, however, are of differential length and are linked to a common yoke to which power is applied at intermediate points, relative lengths of the levers being such that different couples are applied to the different cam levers and the loads developed are equalized.

For a full appreciation of the advantages of my invention and an understanding of their realization, reference is to be had to the accompanying drawings, in which Figure 1 is a side elevation of an automobile brake mechanism, the two shoes of which bearing new linings are delineated as mounted upon a fixed supporting plate usually carried by the fixed axle of the vehicle, the brake drum per se usually connected with the wheel which is not shown, and the mechanism being in off position.

Figure 2 is a section plan view on line 2—2 of Figure 1, looking in the direction of the arrows and showing the parts of this section of Figure 1 in their proper relation, and also the braking connection to the power applying yoke.

Figure 3 is a section on line 3—3 of Figure 1, showing the brake anchoring means.

Figure 4 is an elevation of that portion of the mechanism shown in Figure 1 showing the cam lever load applying means in load applying position on forward operation, certain parts removed.

Figure 5 is an elevation of that portion of the mechanism shown in Figure 1 showing the cam lever load applying means in load applying position in reverse operation, certain parts removed.

Figure 6 is a vertical section of the power applying yoke connection and adjacent parts approximately of Figure 1. Figures 2 and 6 depict the connection especially utilizable in connection with rear axle brakes.

Figure 7 is a vertical transverse cross section of a brake applying connection to the yoke suitable especially for front axle brakes.

Figure 8 is a partial side elevation of the same connection with certain parts omitted.

Figure 9 is a section on line 9—9 of Figure 1, showing the adjusting means.

Figure 10 shows the right hand portion of the brake in off position with an old lining and the brake in adjusted position.

Figure 11 is an elevation of that portion of the mechanism shown in Figure 1 showing a right hand lever load applying means in load applying position in forward operation, certain parts removed, the reverse operating position being the same as off position of Figure 1.

Figure 12 is a section on line 12—12 of Figure 1 showing one of the brake operating levers.

Figure 13 is a perspective view of the left hand operating lever.

Throughout the several figures of the drawings, similar reference characters are used to designate the parts. Referring to the drawings, and particularly Figure 1, the fixed supporting plate for the brake shoes is designated 10. It is shown as provided with a central aperture 11 to fit over the axle end and with an inner periphery 12 provided with bolt holes 13 for mounting. Its outer periphery is provided with the usual strengthening and dust guard flange 14. The brake shoes are designated 15 and their opposite ends 16, 17, 18 and 19, respectively. These shoes are of the conventional transverse T-cross section provided with lining 20 on the periphery of the head of the T-section and are preferably rigid members. They are adapted to co-act through the lining 20 with the brake drum 21 carried by the wheel or other revolving part and revolved in respect to the fixed support 10. The particular form of the brake support 10 and the brake drum 21 have no particular moment in connection with this invention, nor do the particular forms of cross section of the bodies of the brake shoes. This invention has to do with the mounting of these shoes and the mechanism for applying the mounting of the shoes, the adjusting of them and the means for applying the loads thereto.

Intermediate the adjacent ends 16 and 18 is provided a load applying means in the form of a cam lever 22. This lever is floatingly mounted for annular flotation about the anchor and centering pin 23 by means of an elongated slot 24 through which the pin 23 projects, whereby the cam ends may partake of a limited annular movement backwardly or forwardly with respect to the pin 23. The cam 25 of this lever is bipartite, comprised of one part lying on each side of the pin 23 and extending with the lever 22 in general substantially radially of the mechanism. The cams 25 co-act with cam surfaces 26 also of bipartite form (divided in two in the region of the pin 23 by an arcuate seat for engaging the pin, see Figs. 4 and 5) connected with the ends 17 and 18 of the shoes thereby when the power is applied to lever 22, as indicated in Figs. 4 and 5, one part of cam 25 co-acts with one cam surface 26 to constitute a fulcrum for the lever 22, while a mating part 25 co-acts with the part 27 of an adjacent shoe end 16 to apply the load of the shoe. Thus direction of the brake being assumed in the direction of the arrow about the periphery of Fig. 1 and the load being assumed to be applied to hinder end 16 as the degree of braking in such case, the same application of power to each of the cam levers will result in different applications of the load. This is for the reason that in the instance of the left hand lever 22 illustrated, the fulcrum consists of those portions of cam 25 and surfaces 26 and 27 lying radially innermost, and the load application is made to those parts 25, 26 and 27 lying radially outermost, while in the instance of the right hand device, the load is applied through a different system. The operation of this mechanism is shown on Figs. 4 and 5 as to forward or reverse operations respectively.

Interposed between the shoe ends 17 and 19 is another part of the operating mechanism and the adjusting means. Adjustment for wear of the brakes is accomplished through a simple mechanism comprising pins 35 and 36 arranged to effect an interconnection of the shoe with the right hand pivot. These pins are arranged in a suitable housing 37 which is secured to the fixed backing plate 10 by rivets or other means 38. The pins 35 and 36 are arranged for reciprocating movement in the elongated bearing portions 39, centrally of which is located a main adjusting element comprising a bolt or pivot member 55 having a conical head 40 which may or may not have a smooth surface or a notched surface depending upon the exigencies of the brake use, the notched arrangement providing a means for a more definite retention of the brake adjustment as compared with the smooth conical surface. The member 40 additionally has a screw threaded shank 41 engaging the screw threaded bearing 42 in the housing 37 and having at its outer extremity a flat or square portion 47 suitable for the application of a wrench or other member to take up any lost motion in the brake shoe by the movement of the conical surface 40 from right to left thus forcing apart the pins 35 and 36. A cover 53 may be applied to the housing concealing the adjustment member and likewise preventing the ingress of dirt or other foreign materials. Pins 35 and 36 have corresponding tapered and V-shaped ends 54 which engage the conical surface 40. The opposite ends 57 and 58 of the pins being suitably shaped for engagement with the brake shoe end 17 and the right hand operating lever. The portion 57 is slotted at 71 and arcuate 72 in cross section. The operating cam or lever at this part of the brake comprises a linkage which automatically maintains the brake operating system in correct arrangement, while coincidentally allowing for tangential adjustment of the brake. This lever comprises one arm 59 pivotally secured at 60 to the backing plate 10 and being rotatable about the pivot. At its outer extremity is pivotally secured at 62 a second lever 61 which latter lever carries cam 63 which in turn engages the portion 27 of brake shoe 15. The cam 63 itself is substantially T-shaped in cross section, the sides of the stem of the T being arcuate at 64 thus providing an arcuate cam surface on one member instead of having a more complex arcuate surface on the brake shoe. This arrangement facilitates commercial production methods and simplifies the operation of the cars. The radial inner extremity of lever 61 bears a ball joint 34 which engages the arm 30 of the yoke 28.

Connected with the levers 22 and 61, however, is a power applying yoke 28 the opposite ends 29 and 30 of which are respectively connected with the left hand and the right hand cam levers. The length of the arms 29 and 30 of the yoke 28 are substantially the same, distances being measured from the intermediate connection 31 through which braking power is applied to the yoke. Through the left hand lever 22 and the right hand lever 61, the developments of the loads applied to the brakes through the cams 25 and cam surfaces are effectually equalized.

Anchor pin 23 while floating the cam lever 22 through the annularly elongated but radially close fitting slot 24 is of itself as an anchor pin fixed to the fixed support 10 by way of the rivets 32 or other securement. The recessing of the ends 17 and 18 is precisely complemental to the circular cross section of the pin 23, but there is no recessing of the ends 16 and 19.

The entire brake assemblage is retained in its normal idle position as shown in Fig. 1 by one and the same pair of retracting springs 33 which draw together and into contact with the anchors, the ends of the brake shoes.

The shoes 15 are identical and interchangeable, especially since they connect with identical opposite ends of the yoke 28 through ball joint connections 34. The cam surfaces 26 of the heels are identical. Likewise the surfaces 27 of the toe ends 16 and 19 are identical with each other as are also their mountings. The yokes 28 are the same for all brakes right or left, front and rear. Thus there is realized a minimum die cost for parts and a maximum saving of time and assembly and adjustment. Most of the parts may be die forgings or die castings. They are straight-forward, simple and light and yet possess strength, reliability, durability and ruggedness. As saving in weight over the usual braking mechanism is effected.

An augmentation of power over and above the usual two shoe brake, provided with but one load applying device acting in unbalanced manner, upon the forward and reverse shoes is very great. Action is perfectly symmetrical in the forward movement of the brake illustrated by the arrow at the periphery of Fig. 1, this by reason of the means employed to equalize unbalanced loading. On reverse movement, the opposite of that illustrated in Fig. 1, see Fig. 5, the action will not be symmetrical for the reason that the other means utilized in the form of the increased mechanical advantage and power applied to the left hand mechanism as shown in Fig. 1 serves to apply a greater toe force to the lower shoe 15 than is applied to the upper shoe 15. Nevertheless, there is obtained a reverse braking action very greatly augmented over and above the reverse braking action of the ordinary two shoe brakes for both shoes are acting independently, each has application of load to its toe in the proper direction and each responds so fully as the load applied warrants. Reverse action taking place for so small a fraction of the total operating time a dissymmetry existing during this period is relatively immaterial compared with the immense advantage obtained through the greatly augmented braking action at large. The symmetry of braking application during all forward movement insures a symmetry of drum distortion and in the net a decreased degree of drum distortion. This symmetry of action coupled with the symmetry of adjustment and the independent adjustment of heel and toe, the latter bringing about always a more general and a more perfect fit of the shoes to the drum and a more uniform clearance, gives a uniform distribution, of that quality of wear which the symmetry establishes between the two equally loaded shoes. A greatly increased life of drum lining and a greatly increased life of brake drum results.

This invention is susceptible of many modifications. In the drawings we show different variations of power applying means, the one shown in Figs. 1, 2 and 6 consists of a bell crank lever 52 the main body of which 43 is journaled in a bearing 44 applied at an angle to the main body of the supporting plate 10. Its inner or shorter arm 45 engages through a ball joint 46 with the power connection 31 of the yoke 28. Its outer or longer arm 52 connects with the drag link or cable. This is the operating device for rear wheel brakes.

Another variation shows an operating device of the brake type for application to front wheels. In this case the operating connection 31 of the yoke makes a ball joint connection 56 with the lower end 48 of the substantially vertically extending reciprocable plunger rod 49 which passes substantially vertically through the angularly inclined joint 50 of the front wheels with the front axle 51. This rod is reciprocated vertically by the braking mechanism bearing vertically down upon the yoke 28 through the ball joint connection 56.

While by way of illustration and example we have described this invention in connection with a preferred embodiment thereof as to structure, and the preferred member of practicing it, it will be obvious to those skilled in the art, after understanding the foregoing specification, that various changes and modifications may be made without departing from the spirit or scope of the invention and we aim in the appended claims to cover all such modifications and changes.

We claim as our invention:

1. In a brake, a brake anchor plate, a plurality of brake shoes, a plurality of pins, means for operatively connecting one end of each of said pins to one end of each of said brake shoes, an adjustable cone mounted on said brake anchor plate in position to co-act with the other end of said pins, said cone having a plurality of notches therein adapted to be engaged by the ends of said pins, means for yieldingly urging said pins into contact with said cone, and means comprising a plurality of levers positioned between one of said pins and its adjacent brake shoe, and arranged to operate the brake.

2. In a brake, a brake anchor plate, a plurality of brake shoes, a plurality of pins, means for operatively connecting one end of each of said pins to one end of each of said brake shoes, an adjustable cone mounted on said brake anchor plate in position to co-act with the other end of said pins, said cone having a plurality of notches therein adapted to be engaged by the ends of said pins, means for yieldingly urging said pins into contact with said cone, and means comprising a plurality of levers positioned between one of said pins and its adjacent brake shoe, and arranged to operate the brake, said levers having a floating pivot common to their one set of adjacent ends.

3. In a brake, a brake anchor plate, a plurality of brake shoes, a plurality of pins, means for operatively connecting one end of each of said pins to one end of each of said brake shoes, an adjustable cone mounted on said brake anchor plate in position to co-act with the other end of said pins, said cone having a plurality of notches therein adapted to be engaged by the ends of said pins, means for yieldingly urging said pins into contact with said cone, and means comprising a plurality of levers positioned between one of said pins and its adjacent brake shoe, and arranged to operate the brake, said levers having a floating pivot common to their one set of adjacent ends, and having fixed and movable ball pivots at their opposite ends.

4. In a brake, a brake anchor plate, a plurality of brake shoes, a plurality of pins, means for operatively connecting one end of each of said pins to one end of each of said brake shoes, an adjustable cone mounted on said brake anchor plate in position to co-act with the other end of said pins, said cone having a plurality of notches therein adapted to be engaged by the ends of said pins, means for yieldingly urging said pins into contact with said cone, and means comprising a plurality of levers positioned between one of said pins and its adjacent brake shoe, and arranged to operate the brake, said levers having a floating pivot common to their one set of adjacent ends, and having fixed and movable ball pivots at their opposite ends, and a yoke arranged to engage said ball pivot whereby to move the brake.

5. In a brake, a brake anchor plate, a pair of pins mounted on said brake anchor plate, an adjustable cone mounted on said brake anchor plate in position to co-act with said pins, said cone having a plurality of notches therein adapted to be engaged by the ends of said pins, means for yieldingly urging said pins into contact with said cone and levers having floating fulcrums positioned adjacent one of said pins having an operating connection for the brake.

6. In a brake, a brake anchor plate, a pair of brake shoes, a pair of pins each of which having an arcuate end surface, means for slidably connecting one arcuate end of one of said pins to one end of one of said brake shoes, an adjustable cone mounted on said brake anchor plate in position to co-act with said pins, said cone having a plurality of notches therein adapted to be engaged by the free ends of said pins, means for yieldingly urging said pins into contact with said cone, whereby the cone may be held in its adjusted position, and means interposed between the arcuate end of the other of said pins and an end of the other brake shoe arranged to operate the brake and maintain relatively movable cam engagement therebetween.

7. In a brake, a brake anchor plate, a brake shoe, a pin, an adjustable cone mounted on said brake anchor plate in position to co-act with said pin, said cone having a plurality of notches therein adapted to be engaged by the end of said pin, means for yieldingly urging said pin into contact with said cone, means for operatively connecting one end of said pin to one end of said brake shoe, said means comprising compound linkages, one set of adjacent ends of the levers having a common floating pivot and the opposite set of ends having fixed and movable pivots.

8. A brake, a pair of shoes having juxtaposed ends adapted to be moved apart to apply the shoes upon the drum, a pair of brake actuators, one engaging and actuating one juxtaposed pair of shoe ends in opposite directions and the other engaging and actuating one only of the other juxtaposed pair of the shoe ends, a brake adjusting device common to said latter juxtaposed pair of shoe ends adjustably engaging one of said shoe ends directly, and the other of said shoe ends indirectly through the associated actuating means.

9. In a brake, a brake shoe, adjusting means for the shoe having an adjusting movement, an actuating means for the shoe interposed between the adjusting means and the shoe and having actuating and brake adjusting movements independent of each other, which actuating means comprises a pair of scissors levers, the relatively movable ends of which are the one fixed in position and the other movable to apply the brake, and the bodies of which have their movements limited by said adjusting means on the one side, and one of the bodies of which alone re-acts upon the shoe.

10. In a brake, the combination of a drum, a pair of brake shoes having their ends juxtaposed, a pair of actuators arranged one between each of the juxtaposed ends of said shoes, said actuators being arranged to apply equal braking pressure to the shoes in one direction of movement of the drum, and common means for simultaneously and equally adjusting the shoes to compensate for wear on each shoe, said means being arranged wholly between one pair of juxtaposed ends of said shoes.

CAROLUS L. EKSERGIAN.
ROBERT B. TEMPLE.